US005895622A

United States Patent [19]

Ramani et al.

[11] Patent Number: 5,895,622

[45] Date of Patent: Apr. 20, 1999

[54] METHOD AND APPARATUS FOR COMPOSITE MANUFACTURE

[75] Inventors: Karthik Ramani, West Lafayette, Ind.; Daniel Edward Woolard, Dayton, Ohio; Mark Stephen Duvall, Lafayette, Ind.

[73] Assignee: Purdue Research Foundation, West Lafayette, Ind.

[21] Appl. No.: 08/833,595

[22] Filed: Apr. 7, 1997

[51] Int. Cl.$^{6}$ .......................... B29C 35/10; B29C 70/20

[52] U.S. Cl. .......................... 264/440; 118/36; 118/308; 118/312; 118/630; 118/634; 118/712; 156/166; 156/173; 156/175; 156/180; 156/250; 156/272.6; 156/273.1; 156/379.6; 156/441; 156/510; 264/131; 264/140; 425/90; 425/135; 425/174.8 E; 425/289; 427/185; 427/195; 427/289; 427/393.5; 427/424; 427/461; 427/482; 427/485

[58] Field of Search .................................. 264/131, 140, 264/440; 425/90, 135, 174.8 E, 289; 156/166, 173, 175, 180, 250, 272.6, 273.1, 379.6, 441, 510; 427/185, 195, 289, 393.5, 424, 461, 482, 485; 118/36, 308, 312, 630, 634, 712

[56] References Cited

U.S. PATENT DOCUMENTS

| | | | |
|---|---|---|---|
| 3,817,211 | 6/1974 | Brown et al. | 118/630 |
| 4,292,105 | 9/1981 | Taylor . | |
| 4,614,678 | 9/1986 | Ganga . | |
| 4,713,139 | 12/1987 | Ganga . | |
| 4,714,642 | 12/1987 | McAliley et al. . | |
| 4,765,544 | 8/1988 | Kuhn et al. . | |
| 4,779,564 | 10/1988 | Kiefer et al. . | |
| 4,839,199 | 6/1989 | de Jager . | |
| 5,057,338 | 10/1991 | Baucom et al. . | |
| 5,094,883 | 3/1992 | Muzzy et al. . | |
| 5,102,690 | 4/1992 | Iyer et al. . | |
| 5,123,373 | 6/1992 | Iyer et al. . | |
| 5,128,199 | 7/1992 | Iyer et al. . | |
| 5,171,630 | 12/1992 | Muzzy et al. . | |
| 5,295,039 | 3/1994 | Nakajima et al. . | |
| 5,302,419 | 4/1994 | Muzzy . | |
| 5,337,131 | 8/1994 | Sagiv et al. . | |
| 5,370,911 | 12/1994 | Throne et al. . | |
| 5,412,212 | 5/1995 | Rushing . | |

OTHER PUBLICATIONS

Karthik Ramani and Mark Duvall, *In–situ Composite Manufacture Using Electrostatic Powder Spray Processing and Filament Winding*, Submitted to National Science Foundation under Grant No. PDM–9308498, (Jan. 1996).

Mark Duvall and Karthik Ramani, *In–situ Composite Manfuacture using an Electrostatic Spray Process and Filament Winding*, Proceedings, 10th Annual Int'l Conference on Composite Materials, procedings, vol. 3, pp. 469–476, (Aug. 1995).

(List continued on next page.)

*Primary Examiner*—Leo B. Tentoni
*Attorney, Agent, or Firm*—Woodard, Emhardt, Naughton, Moriarty & McNett

[57] ABSTRACT

A composite manufacturing system moves a multi-fiber tow through a processing space. A resin particle source provides particles to the space. This source may include an airstream entrained with particles which is discharged into the space through an orifice; the airstream diverging as it enters the space. An electrode is disposed in the space to electrostatically charge the particles and facilitate deposition of the charged particles on the tow. In one embodiment, the electrode includes a corona wire disposed proximate to the tow to provide a generally cylindrical charging region. An electric field useful to direct deposition of the particles may be generated by appropriately shaping a wire electrode and orienting it in a predetermined manner relative to the tow. After the particles are deposited, a fixation unit may be used to at least partially melt the deposited particles. A processing stage may be included which has a pair of surfaces configured to heat and compress the tow therebetween. Multiple post-deposition processing stages to heat and compress the tow may be employed to improve resin impregnation among fibers of the tow.

58 Claims, 9 Drawing Sheets

OTHER PUBLICATIONS

Mark Duvall and Karthik Ramani, *Application of an Electrostatic Spray Process to Filament Winding*, American Society Mechanical Engineering Proceedings, (1995).

*Heated Tow Impregnation and Heated Die Close Up*, Photographs, (1995).

Karthik Ramani, Daniel E. Woolard, and Mark S. Duvall, *An Electrostatic powder Spray Process for Manufacturing Thermoplastic Composites*, Polymer Composites, vol. 16, Issue 6, pp. 459–469, (Dec. 1995).

D.E. Woolard and K. Ramani, *Electric Field Modeling for Electrostatic Powder Coating of a Continuous Fiber Bundle*, Journal of Electrostatics, vol. 35, No. 4, pp. 373–385, (1995).

K. Ramani and F.F. Caillat, *Manufacture of S–2 Glass/Polycarbonate Composites by Electrostatic Powder Spray Coating*, (date unknown).

Dr. K. Ramani and M. Bays, *In–situ Manufacture of Thermoplastic Composite Tubes*, (date unknown).

Karen J. Fisher, *Low–Cost Thermoplastic Composites: On The Verge?*, Advanced Composites, pp. 30–36, (Jan./Feb. 1993).

METHOD AND APPARATUS FOR COMPOSITE MANUFACTURE

The U.S. Government has a paid-up license in this invention and the right in limited circumstances to require the patent owner to license others on reasonable terms as provided for by the terms of Grant No. DDM-9308498 awarded by the National Science Foundation.

BACKGROUND OF THE INVENTION

The present invention relates to a method and system for the production of resin coated fibers.

Composite materials are enjoying a steady and significant increase in popularity across many different products and industries. Fiber-reinforced resin composites have gained an increasing market share for high performance parts used in various industries, as for example automotive and aircraft components. Generally, such composites are formed from a "prepreg" that includes carbon or glass fibers impregnated with a polymeric resin. The impregnated fibers are wound or layered against rigid mold surfaces and cured into structural parts. Sometimes the fibers are woven or braided to enhance various properties of the composite.

A "towpreg" is one type of composite prepreg which is formed by impregnating long continuous bundles of reinforcing fibers called "tows." Tows of carbon or glass filaments are commercially available and may vary widely in the number of filaments per tow. Many matrix resins are also available; however, two kinds of matrix resin systems are of particular interest: thermoset and thermoplastic polymers.

A thermoset resin usually reacts in the presence of heat or a catalyst to produce a 3-dimensional structure that cannot be reshaped. Epoxies and certain polyimides are examples of thermosetting resins used in composite technology. Generally, thermoset materials have a relatively low viscosity during fiber impregnation.

In contrast, thermoplastic materials often have a significantly higher viscosity, typically $10^3$–$10^7$ times greater than thermoset resins. This relatively higher viscosity makes fiber impregnation with thermoplastic resins more difficult compared to typical thermoset resins. However, unlike thermoset resins, a thermoplastic resin retains its two-dimensional structure in the presence of heat and pressure. As a result, thermoplastic resins can be softened or melted many times, thus allowing for reshaping. Poly(aryl) ether ketone ketone (PEKK), Polyether-etherketone (PEEK), and ultra high molecular weight polyethylene (UHMWPE) are examples of high performance thermoplastics used in forming composites. Thermoplastic matrix composites are drawing increased interest, in part due to their excellent toughness, impact and chemical resistance, and potential for shorter processing times when compared with their thermoset counterparts. Unfortunately, the high melt viscosities of thermoplastic polymers hinder the uniform impregnation of the composite fiber with resin during component manufacture. For thermoplastic composite materials to expand beyond their current high performance and niche markets, cost-effective processes must be developed that rapidly and uniformly impregnate fibers with resin and permit greater control over resin content.

Fiber towpregs can be produced by a number of impregnation methods including hot melt, solution, emulsion, slurry, surface polymerization, fiber commingling, film interleaving, and dry powder techniques. Among these techniques, dry powder processing is emerging as an attractive method for achieving a low-cost manufacturing process.

Dry powder processes deposit polymeric resin particles directly on the fibers and then fix the powder particles onto the fibers to form a towpreg. The significant advantages of dry powder techniques are the elimination of solvents, the reduction in stress on the fibers, and the improved reclamation of unused resin powder. Avoidance of solvents and recovery of unused powder reduces environmental hazards and provides significant economic advantages as well. Various dry powder processes are described in U.S. Pat. Nos. 3,742,106 to Price, 4,614,678 to Ganga, 5,057,338 to Baucom et al., 5,094,883 to Muzzy et al., 5,123,373 to Iyer et al., and 5,370,911 to Throne et al.

One dry powder process for impregnating glass or carbon fibers uses a spray gun to direct polymer powder particles entrained in an airstream onto a continuous fiber tow. Prior to discharge from the gun, the powder is directed past a point source corona field to electrostatically charge the particles. After charging, the particle laden airstream is expelled through a nozzle at a relatively high rate of speed. Generally, the powder mass flow rate from the spray system needs to be high to propel particles over a significant area of the tow. As the expelled particles near the surface of the tow, an electrostatic attraction between the charged particles and the tow causes some of the particles to adhere to the tow fibers. Unfortunately, the high powder velocity needed to effectively distribute particles over the tow often inadvertently removes previously deposited powder, which limits powder coating thickness and uniformity. Also, the momentum of rapidly moving particles may overcome electrostatic attraction to the grounded fibers, causing the particles to miss the tow.

One attempt to solve these problems might be to increase the strength of the electric field by moving the gun closer to the tow. However, the closer the gun is to the tow, the more severe the airstream removal. Powder flow through a nozzle creates a fan-shaped pattern emanating from the nozzle exit. Moving the gun closer to the tow often results in a narrower powder distribution with more difficulty coating the tow. Recognizing these limitations, one focus has been to find an optimal combination of spray gun parameters for a given resin/fiber configuration. Such parameters may include the distance from the tow, the discharge velocity, the discharge spray pattern, and electrostatic charging voltage. Even with optimization, electrostatic spray gun deposition still fails to provide the coating thickness and uniformity sought for many fiber-reinforced resin applications. Moreover, the process remains relatively slow and uneconomical for many products that would otherwise potentially benefit from the availability of less expensive composites. Furthermore, coating multiple tows generally requires multiple guns, complicating the deposition system and increasing the difficulty of obtaining a uniform deposition.

Another limitation of many powder deposition systems is that it is often difficult to uniformly impregnate the fibers with the resin after deposition. The presence of voids in the fiber/resin matrix generally weakens the composite structure and undermines reliance on various standard parameters such as resin volume fraction and fiber mass fraction of the composite. In one attempt to improve impregnation, the deposited particles may be melted and the tow pulled through a die that tapers to a fixed cross-section to "squeeze out" voids, but the pulling speed is usually quite limited to avoid damaging tow fibers. Also, a fixed die generally needs to be custom machined and hardened to withstand abrasion from the fibers, which makes it expensive. In addition, the entire mass of the die is heated, consuming significant energy.

Thus, a need remains for techniques to improve fiber tow composite manufacture. The present invention satisfies this need and provides other significant advantages.

SUMMARY OF THE INVENTION

The present invention relates to manufacture of a towpreg. Various aspects of the invention are novel, non-obvious, and provide various advantages. While the actual nature of the invention covered herein can only be determined with reference to the claims appended hereto, certain features which are characteristic of the preferred embodiment disclosed herein can be described briefly.

One feature of the present invention is a technique of generating an electric field to control deposition of charged resin particles on a tow. This feature may include disposing an electrode across a portion of the tow to generate the field therealong. Deposition control may be generally decoupled from pneumatic particle delivery influences by orienting the electrode in accordance with the present invention.

A further feature of the present invention is a composite manufacturing technique that includes moving a tow of long continuous fibers through a processing space and discharging a pressurized fluid stream entrained with a number of resin particles into the processing space through an orifice. The stream diverges from the orifice to distribute the particles in the processing space. At least a portion of the particles received in the processing space are electrostatically charged with a wire electrode positioned in the processing space. The resin particles are deposited on the tow and fixed thereto. Preferably, the electrode generates a cylindrically shaped corona charging region which may be oriented relative to the tow and orifice to control particle deposition.

In another feature, a composite manufacturing technique includes electrostatically depositing a number of resin particles on a tow having a number of long continuous fibers and heating the tow to form a molten resin matrix from the particles. The tow is pulled between a pair of surfaces with at least one of the surfaces engaging the tow under a spring bias to controllably compress the tow and matrix between the surfaces. The spring bias is adjustable and may be regulated by a processor coupled to an associated actuator. Multiple impregnation stages each having a pair of tow compressing surfaces may be used to distribute a molten resin matrix among fibers of a tow.

Accordingly, it is one object of the present invention to control resin particle deposition on a tow with an electric field generated by selectively orienting an electrode relative to the tow.

Another object of the present invention is to electrostatically charge resin particles along the length of an electrode. This electrode may include a wire configured to provide a generally cylindrical corona charging region.

Another object is to separate the delivery nozzle creating the powder distribution from the charge location at the electrode.

Yet another object is to provide a faster, less expensive way to controllably and adjustably impregnate tow fibers with a resin.

Further features, objects, and advantages of the present invention will be apparent from the drawings and discussion herein.

Figure 3A:
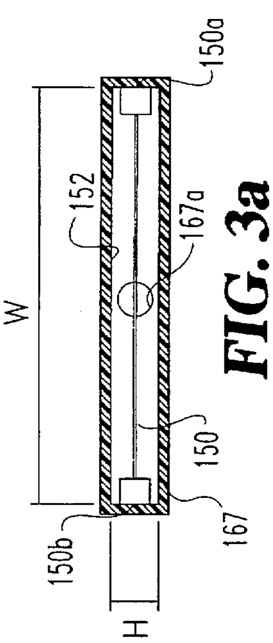
FIG. 3 is a partially diagrammatic side view of a second preferred embodiment of the present invention.
Figure 3B:
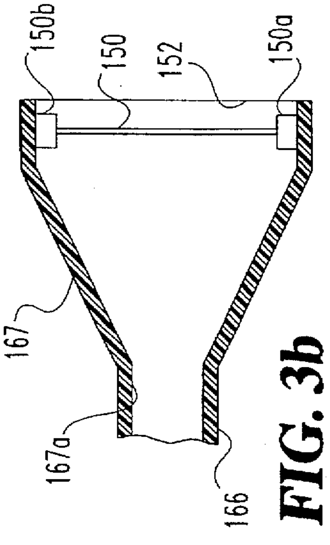
Figure 3:
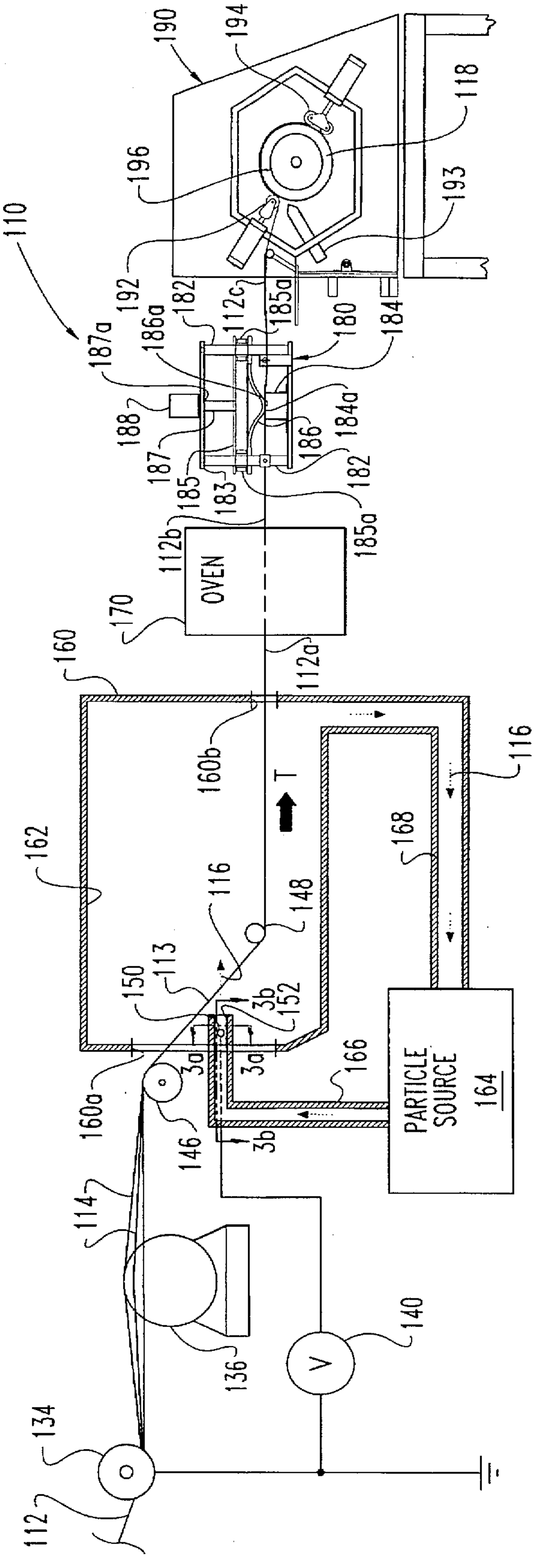

FIG. *3a* is a partial sectional view taken along the section line *3a—3a* shown in FIG. 3.

FIG. *3b* is a partial sectional view taken along section line *3b—3b* of FIG. 3. FIG. *3b* has a view plane that is generally perpendicular to the view plane of FIG. *3a*.

Figure 4:
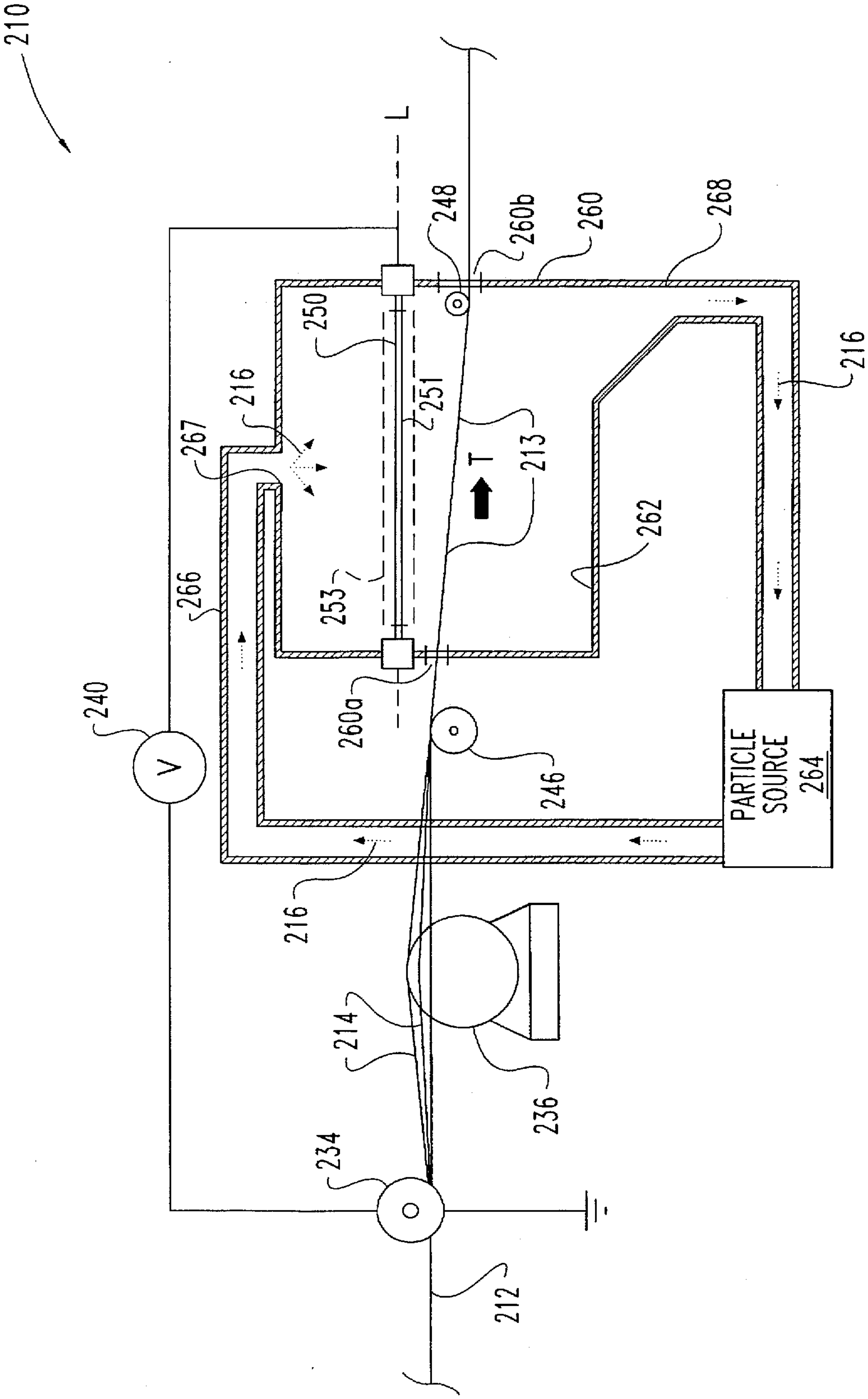

FIG. 4 is a partially diagrammatic side view of a composite manufacturing system of a third preferred embodiment of the present invention.

FIG. *5a* is a partially diagrammatic top view of a fourth preferred embodiment of the present invention.

FIG. *5b* is a partially diagrammatic top view of a fifth preferred embodiment of the present invention.

Figure 6:
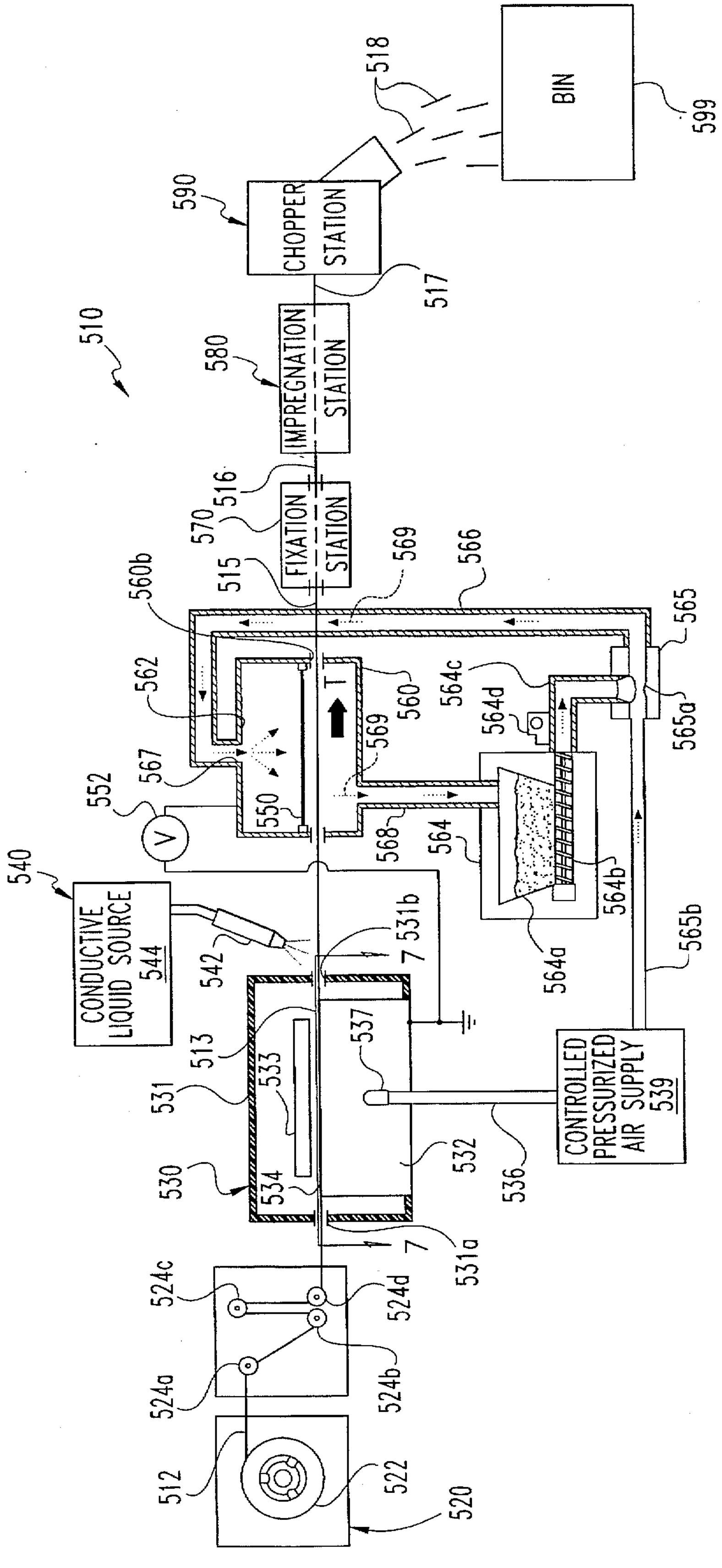

FIG. 6 is a partially diagrammatic side view of a sixth preferred embodiment of the present invention.

Figure 7:
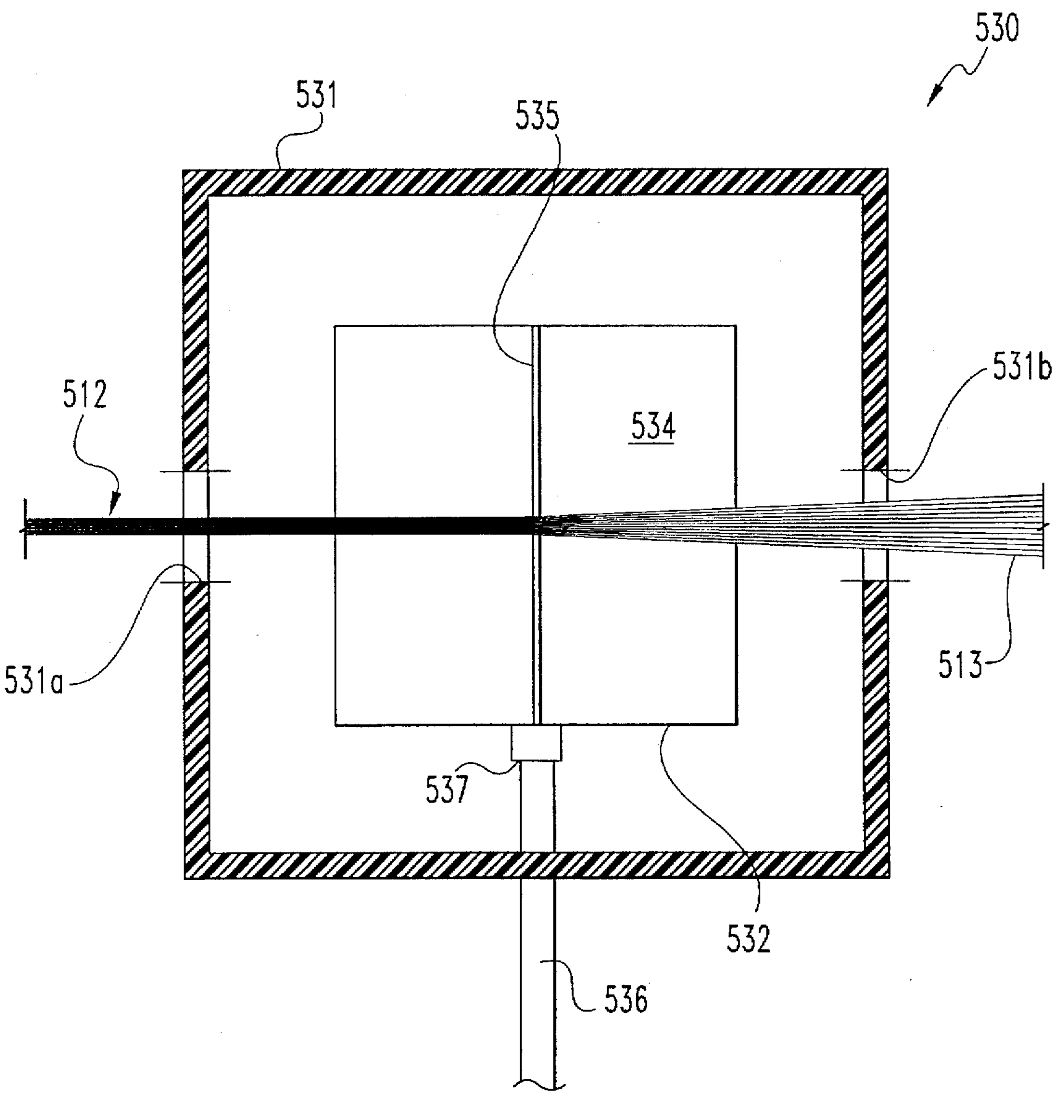

FIG. 7 is a partial top view of the embodiment of FIG. 6.

FIG. *8a* is a partially diagrammatic side view of a seventh preferred embodiment of the present invention.

FIG. *8b* is a partial end view of the embodiment of FIG. *8a*.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the illustrated device, and any further applications of the principles of the invention as illustrated therein being contemplated as would normally occur to one skilled in the art to which the invention relates.

Figure 1:
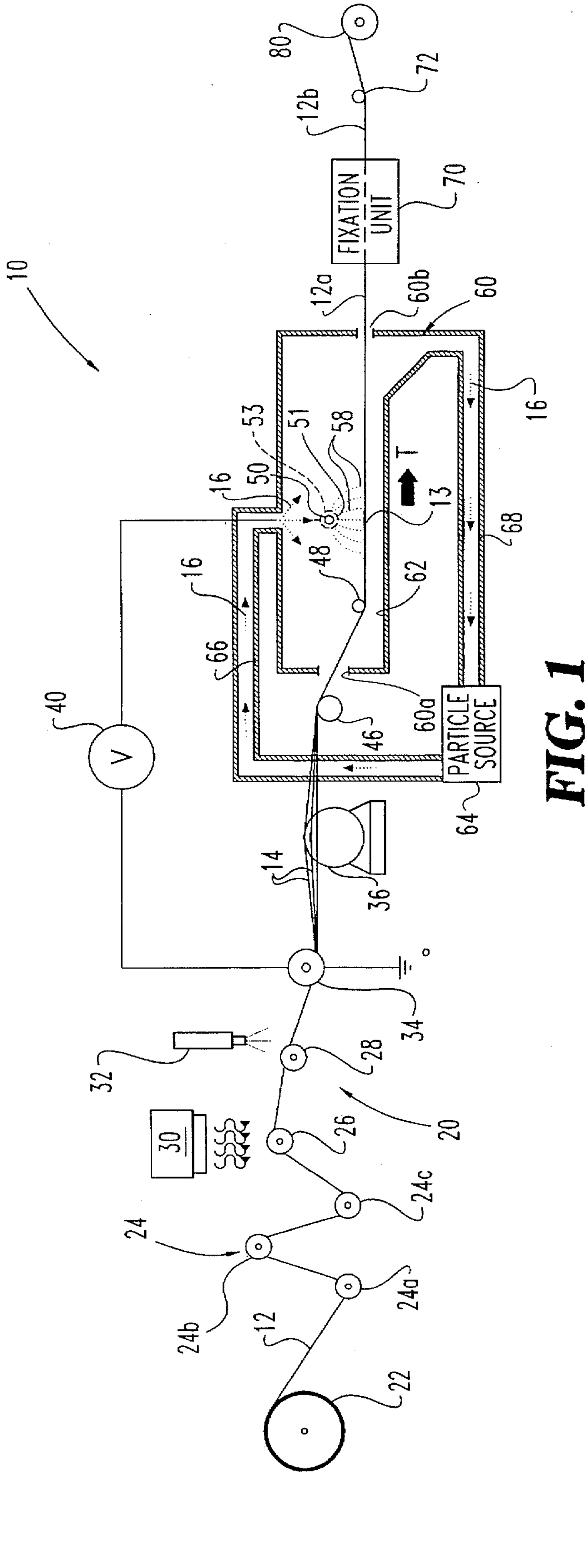
FIG. 1 is a partially diagrammatic side view of a composite manufacturing system of a first preferred embodiment of the present invention.
Figure 2:
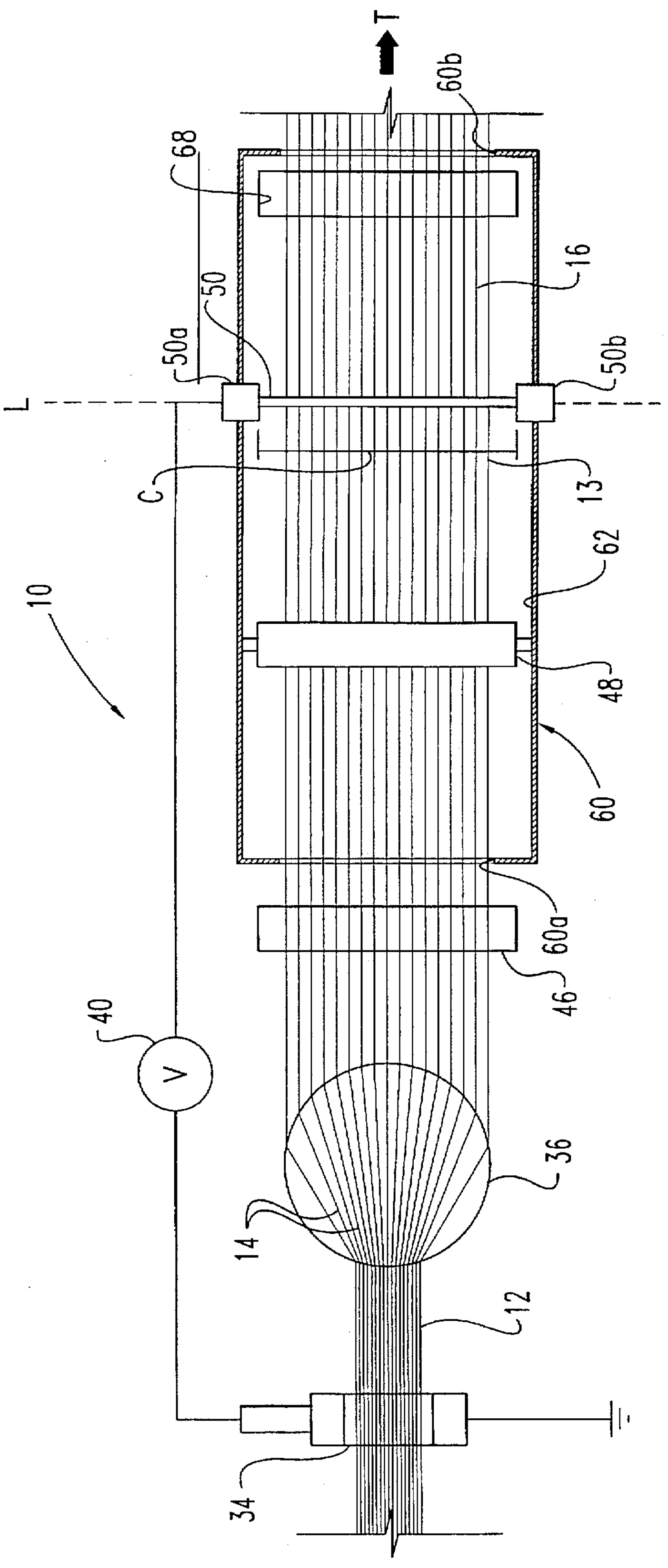
FIG. 2 is a partially diagrammatic top view of a portion of the system shown in the embodiment of FIG. 1.

FIGS. 1 and 2 depict a composite manufacturing system 10 of the present invention. System 10 includes transport 20 which conveys tow 12 comprised of long continuous fibers 14 along an axis of travel generally parallel to the view planes of FIGS. 1 and 2; and in the direction represented by arrow T. Transport 20 is configured to move tow 12 through processing chamber 60 to deposit resin particles thereon as represented by arrows 16 in FIG. 1.

Transport 20 includes a source spool 22 from which tow 12 is obtained. The tow passes through a tensioning system 24 having rollers *24a*, *24b*, and *24c*. Tow 12 next encounters guide roller 26 and centering pulley 28. In the region of roller 26 and centering pulley 28, tow 12 is exposed to nitrogen gas heater 30. Heater 30 softens any polymer binder which may be present on the tow and the nitrogen gas often helps to reduce or prevent degradation of sizing on tow 12. Typically, the sizing helps molten resin particles adhere to the fibers. The gas flow also may help to separate tow 12 into individual filaments.

After heating tow 12 with heater 30, sprayer 32 mists tow 12 with a conductive liquid to promote electrical conductivity along the tow. Preferably, a fine water mist is used. The water also helps prevent fiber breakage and aids smooth, consistent spreading during later stages. Furthermore, the water is helpful in promoting the adherence of particles deposited on tow 12.

After centering pulley 28, transport 20 moves tow 12 into contact with grounding pulley 34 to further guide tow 12 and maintain tow 12 at generally the same electric potential as pulley 34. Next, tow 12 contacts spherical spreader 36. Preferably, tow 12 is spread mechanically by spreader 36 between 4 and 6 times its original width. As the tow enters the spreader stage, centering pulley 28 and grounding pulley 34 positions tow 12 laterally and constrains it to pass over a smooth spherical surface of spreader 36. The existing fiber tension pulls the filament against both the curved leading and trailing edges of spreader 36. Each individual fiber of tow 12 will seek the shortest path across spreader 36, causing fibers 14 of tow 12 to spread over the sloped surface. After spreader 36, tow 12 is generally thinner with fibers 14 being generally distributed along a plane. A number of factors help determine final spreading width including fiber tension, spreader 36 dimensions, spreader 36 position relative to grounding pulley 34, tow preheat, and amount of water added.

Spreading the fibers before applying polymer powder improves deposition in several ways. By spreading the tow to expose the individual fibers, the powder can impregnate through the thickness of tow 12 more thoroughly. Also, with more surface area, maximum achievable resin volume fraction generally increases.

After widening tow 12 with spreader 36, roller 46 guides tow 12 into processing chamber 60 through inlet 60*a*. Chamber 60 defines processing space 62 and includes roller 48 to further guide tow 12 therethrough. Chamber 60 is coupled to particle source 64 which provides airborne resin particles through conduit 66 for subsequent deposition on tow 12 in space 62. Preferably, resin particles enter space 62 in an uncharged state and at a low mass flow rate to avoid adversely impacting uniform deposition on tow 12. Chamber 60 is also coupled to conduit 68 which is configured to collect and return undeposited resin particles to particle source 64 for reuse. Chamber 60 and conduits 66 and 68 are diagrammed in cross-section in FIGS. 1 and 2.

Chamber 60 also encloses electrode 50. Electrode 50 is coupled to chamber 60 by insulated connector 50*a* opposing insulated connector 50*b*. Electrode 50 has surface 51 electrically exposed to tow 12 to permit formation of an electric field therebetween. Electrode 50 has longitudinal axis L spanning across tow 12 generally perpendicular to arrow T. Electrode 50 is generally parallel to a plane containing fibers 14 of tow 12 in region 13. Voltage source 40 is coupled to electrode 50 to apply an electric potential relative to grounding pulley 34.

Voltage source 40 and electrode 50 are configured to electrostatically charge resin particles close to surface 51 of electrode 50 by corona charging. Preferably, surface 51 of electrode 50 is roughened in a known manner to facilitate efficient corona charging. For one preferred embodiment, the voltage range of voltage source 40 is a D.C. voltage of about −20 to −100 kilovolts. For a more preferred embodiment the D.C. voltage range is about −25 to −45 kilovolts. For a most preferred embodiment the D.C. voltage is about −30 kilovolts. For other embodiments a different voltage may be used. These high voltage electrostatic systems function even if there is significant electrical resistance between the tow and "true ground." Under these high resistance conditions, the moistened tow generally remains "conductive enough" to serve as ground for the purposes of particle charging and electric field generation.

The elongate nature of electrode 50 provides a charging region having a substantially right circular cylindrical shape about axis L along charging length C. A cross-section of this field is represented by dashed circle 53 shown in FIG. 1. This region represents the volume about electrode 50 wherein particles have a relatively high probability of being electrostatically charged. For a given distance separating a particle from electrode 50, the charging probability is about the same. Thus, the charging probability does not substantially vary along C, but does vary with the distance of the particle from electrode 50. By spreading corona charging along charging length C of electrode 50, repulsion of like charged particles is generally reduced. Also, the elongate cylindrical shape of the charging region facilitates analysis of corona charging and corresponding electric fields in rectangular coordinates, which is well suited to powder coating of a generally rectilinear portion of a tow. In contrast, the charging region and non-uniform electric field emanating from spray gun systems is more difficult to optimally adjust relative to a generally flat, straight-edged tow.

Preferably, electrode 50 is a roughened corona wire having a charging length of at least one centimeter. More preferably, the charging length in a range of about 1 to 5 centimeters. Most preferably, the charging length is at least 10 centimeters. U.S. Pat. Nos. 5,295,039 to Nakajima et al. and 5,412,212 to Rushing provide additional general information concerning corona charging wires.

Electric field lines 58 are shown to illustrate the generally uniform cross-section of the electric field generated between electrode 50 and tow 12 along axis L upon application of voltage from voltage source 40. This field is generally symmetric about axis L and a vertical plane intersecting axis L. The electric field is distributed along a corresponding distance across tow 12 in the vicinity of exposed region 13.

The expansive exposure of tow 12 to electrode 50 creates an electric field which may be used to direct charged resin particles between electrode 50 and tow 12 onto region 13 without requiring a relatively high powder mass flow rate. The uniformity of the electric field across region 13 and generally perpendicular to the travel axis facilitates a more uniform deposition of charged resin particles along the tow width. Indeed, close to tow 12, electrostatic forces are generally sufficient to overcome gravity and particle momentum, which results in a nearly uniform coating of resin particles around each separated fiber or fiber bundle of tow 12. This highly uniform coating provides a better quality composite.

Notably, the properties of the electric field are a function of the shape and relative orientation of electrode 50 to tow 12. Consequently, distribution of resin particle coating may be controlled by adjusting the relative configuration of electrode 50 and tow 12 within space 62. In contrast, the airstream pattern and electric field of a typical electrostatic spray gun system are tightly coupled, which generally constrains electric field manipulation and powder particle distribution.

After exiting outlet 60*b*, transport 20 then moves coated tow 12*a* into fixation unit 70. For thermoplastic resin particles, fixation unit 70 is preferably a tunnel oven, which at least partially melts the deposited resin particles so that they strongly adhere to tow fibers 14. Coated tow 12*a* exits fixation unit 70 as towpreg 12*b*. Towpreg 12*b* is guided by roller 72 and then wound up on collection spool 80 for subsequent use in manufacturing structural composite parts. For other embodiments, fixation unit 70 may apply a protective coating either with or without heating, or may alternatively utilize another means of fixation.

FIG. 3 illustrates composite manufacturing system 110 of a second preferred embodiment of the present invention.

This embodiment includes a grounding pulley 134 and spreader 136 configured to spread fibers 114 of tow 112 moving along an axis of travel generally parallel to the view plane of FIG. 3, as represented by arrow T. After fibers are spread with spreader 136, tow 112 is guided by roller 146 through inlet 160*a* of chamber 160 (depicted in cross-section). Fibers 114 entering processing space 162 of chamber 160 are guided downward by roller 148 adjacent discharge outlet 152 of conduit 166 (shown in cross-section). Particle source 164 provides an airstream entrained with resin particles. This airstream travels through conduit 166 to divergent plenum 167. Plenum 167 has outlet 152 which intersects space 162 of chamber 160. Unused particles are returned to particle source 164 via conduit 168 (shown in cross-section).

Referring additionally to FIGS. 3*a* and 3*b*, this embodiment has electrode 150 spanning across outlet 152 of plenum 167. Outlet 152 has width W and height H. Electrode 150 is coupled to plenum 167 by opposing insulated connections 150*a* and 150*b*. The airstream is discharged into divergent plenum 167 from conduit 166 through discharge orifice 167*a*. The particle laden airstream diverges as it departs orifice 167*a*. The divergent airstream then encounters electrode 150.

Voltage source 140 is coupled to electrode 150 and grounding pulley 132 to provide an electric potential to electrode 150 relative to tow 112 to facilitate corona charging. Electrode 150 is configured to charge particles along its length as they emerge from plenum 167 and generates an electric field proximate to exposed area 113 of tow 112 to direct deposition of the charged resin particles. Notably, the divergent arrangement of plenum 167 presents a stream of particles 116 traveling with a reduced mass flow rate, which is approximately linearly distributed along electrode 150 for corona charging.

In one embodiment, width W of outlet 152 is about 7.5 inches and height H is about 1 inch to take advantage of better charging from close confines. This embodiment also has a pressure of about 2–8 psi through outlet 152 and includes a roughened nichrome corona wire of about 0.010 inch in diameter for electrode 150. Preferably, PEKK resin particles with about a 50 micrometer particle size and a glass fiber tow are employed in this embodiment. It has been found for this embodiment that the rectangular confines of plenum 167, when suitably matched to the size of the charging region and shape of electrode 150, appear to provide more efficient charging of resin particles as compared to more expansive spaces. Moreover, the size and orientation of electrode 150 and plenum 167 may be arranged relative to area 113 of tow 112 to control coating deposition. In another embodiment, conduit 66 of system 10 includes a divergent plenum 67 arrangement to distribute particles in space 62 over electrode 50. The gradual divergence of the airstream through plenum 67 tends to reduce flow disturbances that may result from the abrupt discharge of the particle stream through a small orifice into a relatively large space. For still other embodiments of the present invention, conduit and plenum arrangements are envisioned as would occur to those skilled in the art.

After coating, coated tow 112*a* exits chamber 160 through outlet 160*b* for post-coating processing by a series of processing stations. From chamber 160, coated tow 112*a* enters melter or oven 170. Oven 170 is preferably a tunnel oven configured to at least partially melt deposited resin particles so that they remain fixed to tow fibers 114. The fiber/resin matrix exits oven 170 as towpreg 112*b*.

Next, towpreg 112*b* encounters impregnation station 180. Station 180 includes a base 181 connected to support posts 182. Posts 182 support top plate 183. Preferably, base 181 and plate 183 generally have the same rectangular shape with the corners of one in registration with the corners of the other. Although only two posts 182 are shown, it is preferred that a support post be secured between base 181 and plate 183 in each corresponding pair of corners to provide a rigid and stable construct.

Station 180 also includes a heated die 184 opposite adjustable plate 185. In one embodiment, die 184 is a 500 watt electric rod heater with a digital temperature controller coupled thereteo. Die 184 heats a generally flat contact surface 184*a*. Plate 185 is configured to slide between base 181 and plate 183 via linear bearings 185*a*. Leaf spring 186 is connected to plate 185 at opposing ends with a smooth, arcuate shape. The shape of spring 186 is configured to guide towpreg 112*b* between surface 184*a* of die 184 and opposing surface 186*a* of spring 186. Preferably, spring 186 is formed from a thin, metallic material which readily conducts heat.

Rod 187 extends through opening 187*a* in plate 183 from a double-acting pneumatic cylinder 188 mounted on top of plate 183. Cylinder 188 is coupled to an appropriate pneumatic controller (not shown) to adjust the extension of rod 187 therefrom. Rod 187 slides through opening 187*a* to position plate 185 along posts 182 in response to activation of cylinder 188.

In operation, towpreg 112*b* passes between surfaces 184*a* and 186*a* and is heated to form a molten resin matrix from the previously deposited particles. Notably, the thermally conductive structure of spring 186 is readily heated by die 184 to provide for uniform heating on both the top and bottom of tow 112*b* as it passes between surfaces 184*a*, 186*a*. To drive-out voids, improve resin wetting to fibers 114, and provide a more uniform resin/fiber distribution, cylinder 188 is adjusted to position plate 185 and correspondingly bear against the top of towpreg 112*b* with spring 186. Preferably, spring 186 is elastically deformed by this adjustment to provide a spring force to press towpreg 112*b* between surfaces 184*a*, 186*a*. Because surface 186*a* is under a spring bias, thickness variations in towpreg 112*b* tend to be smoothed out with a minimal risk of fiber damage.

Notably, the nominal spring bias may be controlled and regulated by positioning plate 185 with cylinder 188. In response, the degree of force and corresponding pressure exerted on towpreg 112*b* may be adjusted. With this adjustment feature, impregnation may be readily optimized for the given configuration. Furthermore, station 180 facilitates adjustments to accommodate different fiber/resin configurations. In contrast, the fixed cross-section die of other systems lack this flexibility, generally making optimization and configuration changes difficult and expensive. Notably, station 180 may be oriented relative to oven 170 so that oven 170 preheats coated towpreg 112*b* for further consolidation by station 180.

The consolidated towpreg 112*c* exits station 180 then enters finishing station 190. Finishing unit 190 has opposing rollers 192, 194 to uniformly wind-up heated towpreg 112*c* about mandrel 196. A hot nitrogen gas torch 193 is used to maintain a high temperature at the point of consolidation to assist with formation of composite tube 118 from towpreg 112*c*. Additional torches, ovens, or other heaters may be employed as required for different sizes and resin/fiber combinations to preheat the tow to improve consolidation at finishing station 190. Composite tube 118 may then be used as a final component or further processed as would occur to one skilled in the art.

FIG. 4 depicts a composite manufacturing system 210 of a third preferred embodiment of the present invention. In system 210, tow 212 is directed under a grounding pulley 234 and spread by spreader 236. Tow 212 moves along an axis of travel generally parallel to the plans of view of FIG. 4, as represented by arrow T. Guide roller 246 guides tow 212 after spreading through inlet 260*a* of processing chamber 260 (shown in cross-section). Tow 212 exits chamber 260 through outlet 260*b* with the assistance of guide roller 248. Chamber 260 is coupled to particle source 264 which has conduit 266 (shown in cross-section) in fluid communication with chamber 260. Conduit 266 discharges airborne resin particles (indicated by arrows 216) into processing space 262 through orifice 267. Chamber 260 is also coupled to conduit 268 (shown in cross-section) to return undeposited resin particles to particle source 264 for reuse. Within chamber 260, elongate electrode 250 is disposed with a longitudinal axis L generally parallel to the axis of travel.

Preferably, electrode 250 is a roughened wire configured to electrostatically charge resin particles along a generally cylindrical corona charging region. A contour of this region is generally represented by dashed rectangle 253. Voltage source 240 is electrically coupled to electrode 250 and grounding pulley 234 to facilitate such corona charging. Tow 212 has an area 213 electrically exposed to surface 251 of electrode 250 to generate an electric field. The electric field resulting from the orientation of electrode 250 along the travel axis provides an alternative coating distribution which generally has a greater thickness at the middle of the tow.

Notably, electrode 250 is separated from tow 212 by a first distance and orifice 267 is separated from tow 212 by a second distance. The second distance is greater than the first distance which corresponds with electrode 250 being between the tow 212 and the orifice 267. Typically, particles 216 are better dispersed in space 262 before charging when electrode 250 is positioned in this manner. Also, the placement of orifice 267 farther away from tow 212 than electrode 250 reduces pneumatic disturbances to resin particles deposited on tow 212.

Figure 5A:
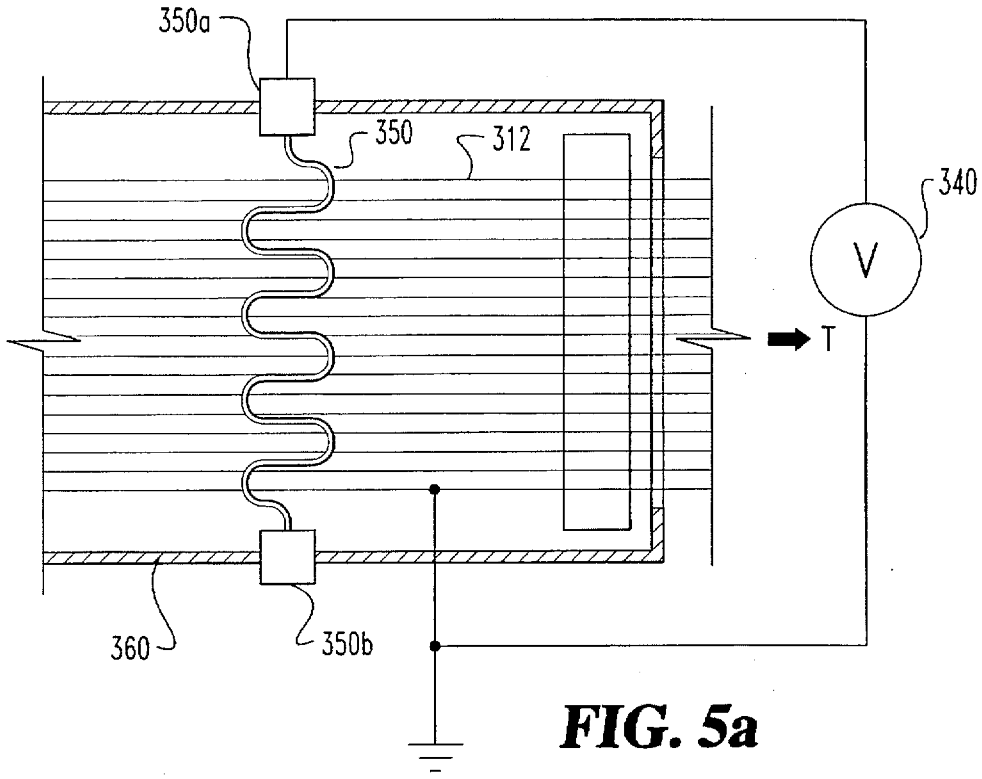

Referring to FIG. 5*a*, another alternative electrode 350 for composite manufacturing in accordance with the present invention is depicted in chamber 360 (shown in cross-section). Notably, electrode 350 has a curvilinear, serpentine form and is fastened to chamber 360 by insulated connectors 350*a*, 350*b*. A voltage source 340 is coupled across electrode 350 and tow 312 to provide an electric potential relative to tow 312 to electrostatically charge resin particles in chamber 360. Tow 312 moves along an axis of travel parallel to the view plane as represented by arrow T.

Figure 5B:
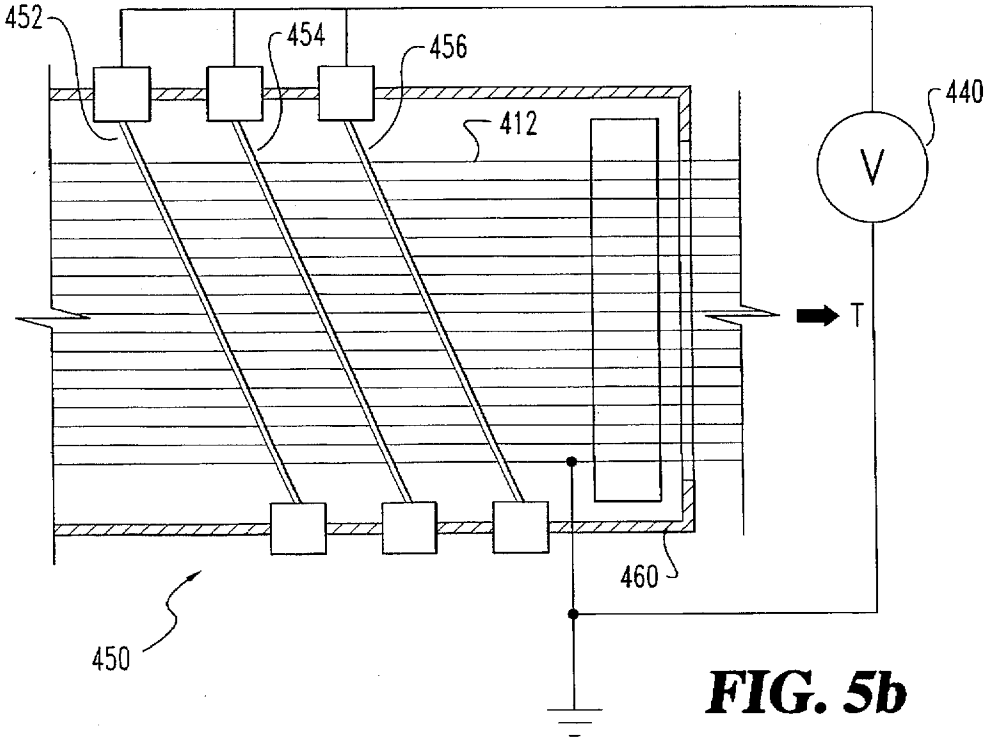

FIG. 5*b* shows still another alternative electrode 450 for composite manufacturing in accordance with the present invention. Electrode 450 is enclosed in chamber 460 (shown in cross-section) to deposit resin particles on tow 412 moving along an axis of travel parallel to the plane of view of FIG. 5*b* as represented by arrow T. Electrode 450 includes a number of elongate electrode segments 452, 454, 456. Each segment 452, 454, 456 traverses tow 412 at a non-perpendicular angle relative to arrow T. Furthermore, each segment 452, 454, 456 is coupled to chamber 460. Similar to previously described embodiments, electrode 450 is electrically coupled to a voltage source 440 to electrostatically charge resin particles and generate an electric field between electrode segments 452, 454, 456 and tow 412. By orienting the segments 452, 454, 456 in a predetermined pattern, a corresponding electric field may be tailored to direct charged resin particles. This electric field may be configured to control distribution so that resin particle deposition is greater or less in certain regions depending on the orientation of segments 452, 454, 456.

Referring to FIG. 6, composite manufacturing system 510 of another preferred embodiment of the present invention is described. System 510 includes a tow 512 with a number of elongate fibers which are dispensed from tension control station 520. Station 520 includes tow source spool 522 from which tow 512 is unwound. Tow 512 is pulled through system 510 along a travel axis in the direction indicated by arrow T using drive rollers in station 590 (not shown). Tow 512 engages pulleys 524*a*–524*d* which cooperate with spool 522 to maintain a generally constant tension. Pulley 524*c* is mounted on a load cell (not shown) which generates a tension signal corresponding to tension of tow 512. To facilitate tension control, spool 522 is mounted on a shaft of a bidirectional motor which winds or unwinds tow 512 in accordance with the tension signal via a closed loop control system. This system may be configured to receive an input corresponding to the desired tension level. In one embodiment, tension control station 520 is implemented with equipment from American Sahm. In other embodiments, a different tow dispensing arrangement may be employed as would occur to one skilled in the art.

After departing station 520, tow 512 encounters spreading station 530. Station 530 includes outer shroud 531 with entrance slot 531*a* and exit slot 531*b*. Within shroud 531, tow 512 passes between plenum 532 and upper plate 533. In one embodiment plate 533 provides about a 0.010 inch gap from top surface 534 of plenum 532. Referring additionally to FIG. 7, a top cross-sectional view of station 530 is illustrated. Surface 534 defines a narrow, elongate slot 535 which is generally perpendicular to the direction of travel of tow 512. Conduit 536 is in fluid communication with the interior space of plenum 532 via coupling 537.

In operation, pressurized air is controllably provided from controlled pressurized air supply 539 via conduit 536 for discharge through slot 535. Tow 512 travels between plate 533 and plenum 532, generally sliding along surface 534. As air is discharged from slot 535 through tow 512, the individual fibers tend to spread apart into a wider area to depart through exit slot 531*b* as spread tow 513. The air discharged through slot 535 exits through the gap between plate 533 and surface 534 of plenum 532.

Spread tow 513 next encounters misting station 540. At station 540 a conductive liquid mist from mister 542 is applied to the fibers of tow 513 to assure proper electrical conductivity. Mister 542 receives the conductive liquid from liquid source 544. Station 540 is placed in close proximity to station 530 to ground tow 513 through contact with plenum 532. Plenum 532 includes a conductive material suitable to provide grounding. In one suitable embodiment, shroud 531 and plate 533 are made from a generally transparent, polymeric resin based plastic compound and plenum 532 is made from aluminum.

Misted tow 514 departs misting station 540 to travel to coating station 548. Station 548 includes electrode 550 coupled to voltage source 552. Electrode 550 is positioned within processing space 562 of chamber 560 with a longitudinal axis generally parallel to the direction of travel of tow 514. Misted tow 514 enters chamber 560 through entrance 560*a*.

Particle supply system 564 is configured to provide a fluid stream entrained with particles to space 562. System 564 includes hopper 564*a* which holds resin particle powder for metering to space 562. Hopper 564*a* includes two agitator paddles (not shown) to feed powder to rotating metering screw 564*b*. Screw 564*b* has a hollow flight to meter powder at a selected rate to tube 564*c*. As screw 564*b* is rotated, powder travels to tube 564*c*. Rotary pneumatic vibrator 564*d* contacts tube 564*c* to fluidize the powder as it travels therethrough. The powder travels down tube 564*c* to venturi pump 565. In one embodiment, tube 564*c* has a vertical drop of about 13 inches. Pump 565 has a narrowed neck region 565*a* in fluid communication with inlet conduit 565*b* through which pressurized air is provided from supply 539. Neck region 565*a* creates a low pressure zone which tends to draw powder from tube 564*c* into the airstream supplied from conduit 565*b*. The powder laden airstream then exits through conduit 566.

Conduit 566 supplies the airstream to orifice 567*a* for discharge into space 562. Notably the airstream diverges as it enters space 562 to distribute powder along the length of electrode 550. Electrode 550 provides a generally cylindrical charging region with its longitudinal axis oriented generally along the length of the fibers of tow 514 to facilitate deposition of large amounts of resin powder. The path of the resin powder is generally designated by arrows 569. Unused powder is returned to system 564 from chamber 560 via conduit 568.

Coated tow 515 departs chamber 560 through exit 560*b* and then encounters fixation station 570. Station 570 is configured to affix deposited resin powder to fibers of the tow to provide towpreg 516. Station 570 may provide fixation by at least partially melting the deposited powder or applying another fixation technique known to those skilled in the art. Towpreg 516 travels from station 570 to impregnation station 580. Station 580 improves impregnation of tow fibers by the resin which then departs as consolidated towpreg 517. Station 580 may be configured similar to station 180 of system 110 previously described. Towpreg 517 enters chopper station 590 from station 580. Station 590 includes a drive mechanism (not shown) to draw the tow fibers through system 510. This mechanism may include one or more frictional rollers or spindles which present the end portion of towpreg 517 to a chopping unit for cutting into a number of pieces or pellets 518. Pellets 518 are collected in bin 599.

For most applications, pellets 518 are preferably at least ⅛ of an inch long. In a more preferred embodiment, pellets 518 have a length in the range of ⅛ of an inch to 1 inch. In another more preferred embodiment, pellets 518 have a width of no more than ⅛ of an inch.

Pellets 518 may be processed in a variety of ways. In one embodiment, pellets 518 collected in bin 599 are subsequently used in an injection molding processes. In another embodiment, pellets 518 are collected on a first endless belt instead of in bin 599 (not shown). This first endless belt carries pellets 518 to a second endless belt. The first and second belts rotate in opposite directions. Pellets 518 are received between the first and second rotating belts to be compression molded therebetween. This compression molding forms a composite sheet from pellets 518 for further processing as would occur to one skilled in the art.

Figure 8A:
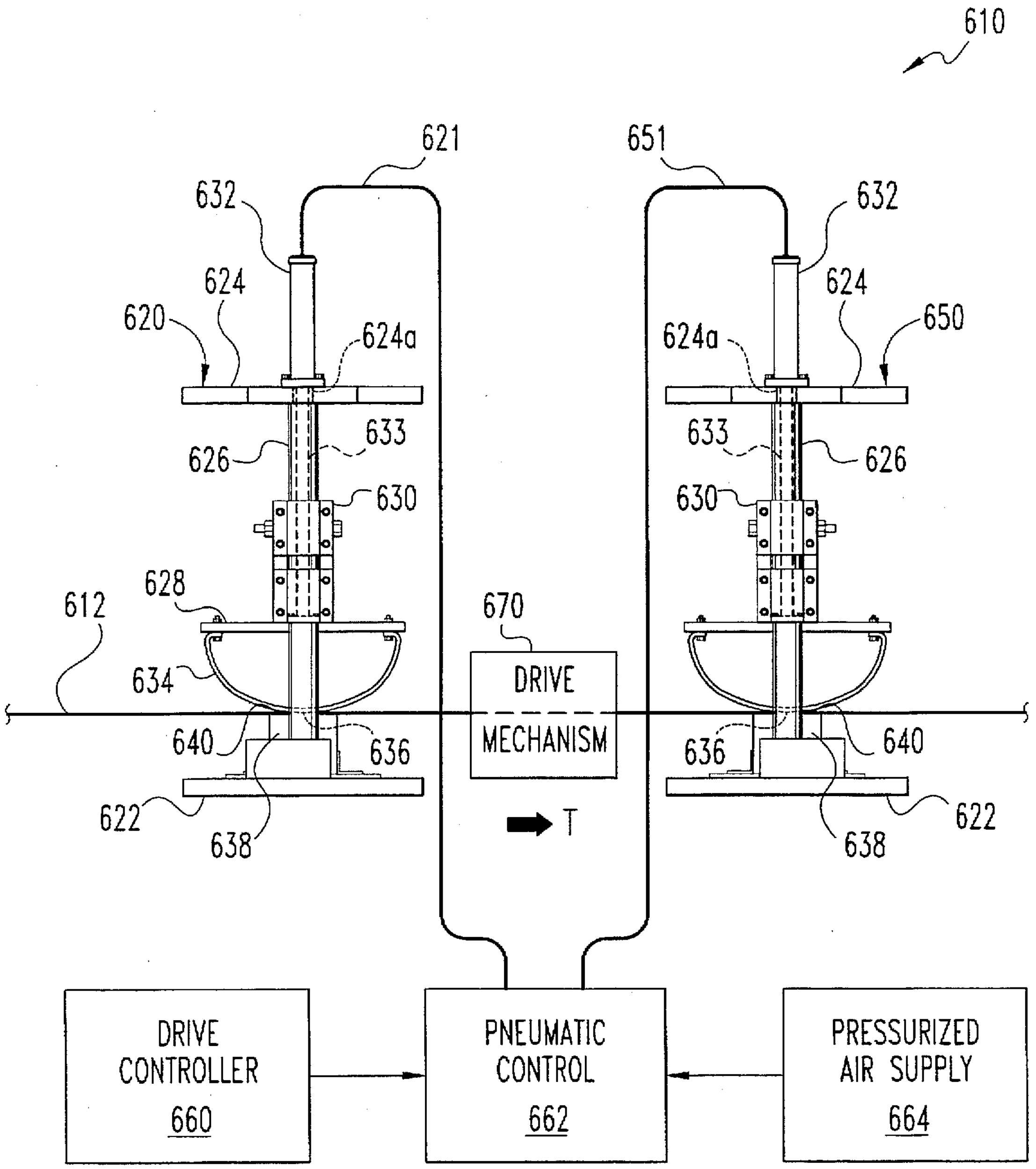
Figure 8B:
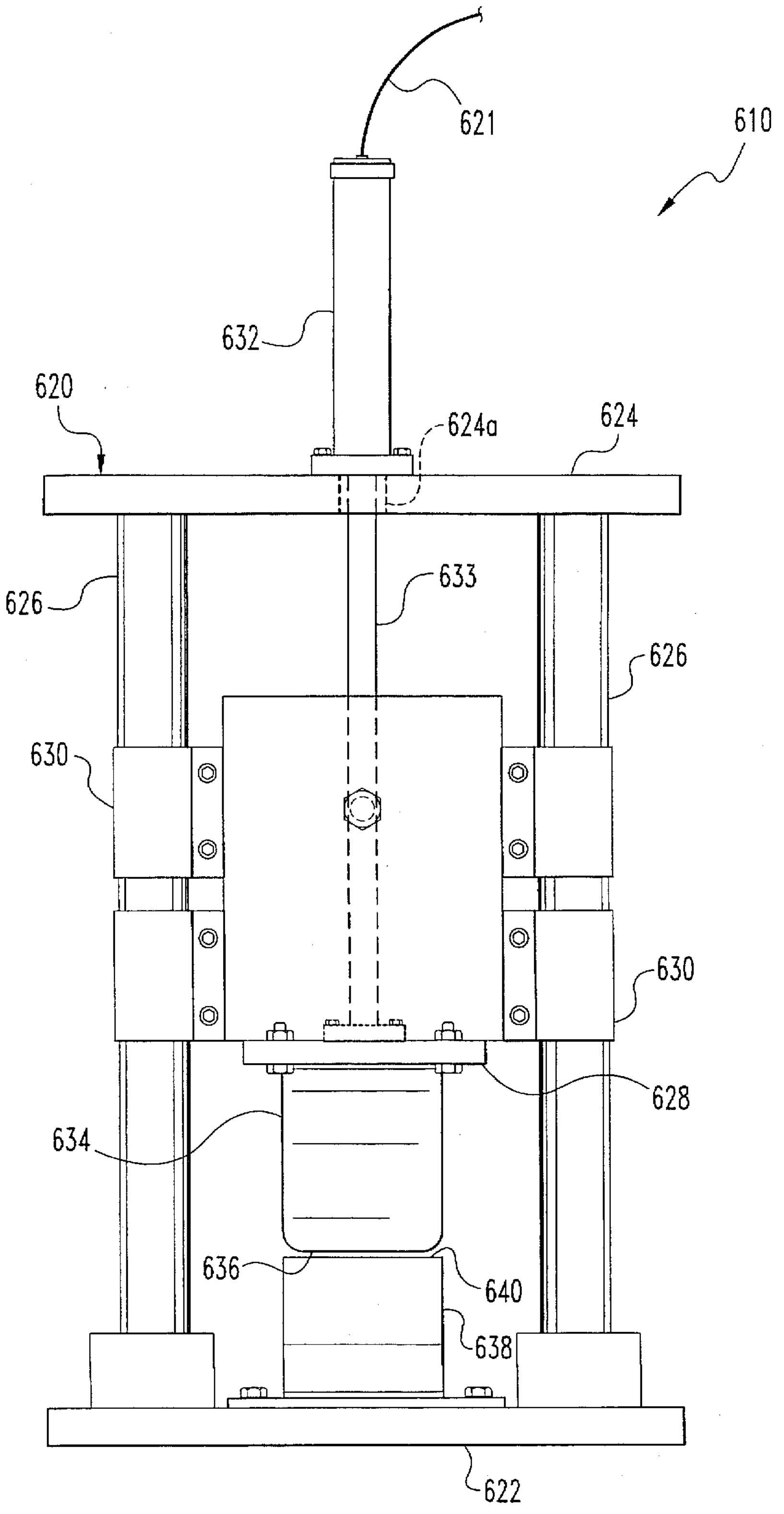

Referring to FIGS. 8*a* and 8*b*, a multi-stage impregnation system 610 of another preferred embodiment of the present invention is illustrated. System 610 may serve as impregnation station 580 for system 510. System 610 includes tow 612 which is carrying a resin compound. Tow 612 is configured for movement in the direction indicated by arrow T. Tow 612 first encounters processing stage 620. Stage 620 includes base 622 and upper plate 624. Plate 624 is supported by two support posts 626 extending from base 622 (see FIG. 8*b*). Posts 626 are located on either side of adjustable plate 628 which is positioned between base 622 and plate 624. Plate 628 is configured to slide up and down along posts 626 via linear bearings 630.

Stage 620 includes double acting pneumatic cylinder 632 mounted to plate 624. Cylinder 632 has rod 633 extending through aperture 624*a* in plate 624 and is configured to move in response to activation of cylinder 632. Rod 633 is connected to plate 628 to adjust position thereof. Plate 628 includes an arcuate leaf spring 634 connected thereto. Spring 634 has contact surface 636. Base 622 includes a heated die 638 configured to heat contact surface 640. Notably, surface 640 provides a generally flat expansive area with which to heat tow 612 and spring 634. Towpreg 612 is heated to melt associated resin and is pressed between surfaces 636, 640 to facilitate impregnation of the fibers of tow 612 by the molten resin. Cylinder 632 positions plate 628 to elastically deform spring 634 similar to the operation of station 180 for system 110 previously described. Heated die 638 may likewise be similar to die 184 of station 180.

Stage 650 is configured with the same structural features as stage 620 which are indicated by like reference numerals. Cylinders 632 are coupled to pneumatic lines 621, 651 for stages 620 and 650, respectively. Lines 621, 651 are representative of the fluid conduits necessary to control the double action of cylinder 632 for each corresponding stage 620, 650. Lines 621, 651 are coupled to controller 660 via pneumatic control 662. Pneumatic control 662 is coupled to pressurized air supply 664 to selectively route pressurized air to lines 621, 651 in accordance with control signals from controller 660. These control signals correspond to a desired position of plate 628 to provide a selected impregnation pressure with spring 634 for each of stages 620, 650. The control signals may be generated by controller 660 in response to an input by an operator or automatically determined from monitoring other parameters of a composite manufacturing system.

Between stages 620, 650 is drive mechanism 670 which pulls tow 612 in direction T. In the absence of mechanism 670, the tension imposed by pulling tow 612 through stages 620, 650 is generally additive, which may undesirably limit tow travel speed. Mechanism 670 reduces tension between stages 620, 650 by pulling on tow 612. Preferably, a mechanism to drive or wind tow 612 downstream of stage 650 is also provided (not shown).

In one embodiment, the pressure against tow 612 provided by stage 620 is less than stage 650. Generally, this difference may be used to improve impregnation quality or increase travel speed of tow 612 for a give impregnation quality level as compared to a single stage system. The heating temperature provide by die 638 for each of stages 620, 650 may also differ to provide a selected heating rate of tow 612 as it passes through system 610. Controller 660 may be adapted to control each die 638 in addition to each cylinder 632. In other embodiments, the temperature and pressure of each stage may be about the same or otherwise controlled as would occur to one skilled in the art.

In still other embodiments, additional spring/die stages may be employed and controlled by controller 660. It is envisioned that a large number of stages may be utilized in series to increase processing speed without substantially impacting quality. Also one or more of cylinders 632 may be replaced by another type of controllable linear actuator such as a hydraulic cylinder or electromagnetic device. Moreover, the impregnation techniques provided by the present invention may be applied to resin/fiber configurations obtained by techniques other than dry powder deposition.

Controller 660 may be an electronic circuit comprised of one or more components including digital circuitry, analog circuitry, or both. Also, controller 660 may be programmable, an integrated state machine, or a hybrid combination thereof. Controller 660 may be adapted to control one or more of the stages, stations, or components previously described in connection with FIGS. 1–7.

Referring generally to FIGS. 1–8, electrodes of the present invention may be used to provide a means for generating an electric field with a selected geometry to control particle deposition in a predetermined manner. In one embodiment, it is preferred that the electrode be elongate and generally linear to facilitate modeling of desired parameters for dry polymer powder coating of a tow. This preferred embodiment may be achieved by employing a corona wire. Similarly, it is preferred that electrodes or electrode segments for the present invention be elongate, with a length of at least about one centimeter. More preferably, the length is in the range of about 1 to 5 centimeters. Most preferably, the length is at least about 10 centimeters.

The electrode of the present invention may be used to charge resin particles and simultaneously provide an electric field to direct deposition of the charged particles. However, in one embodiment, at least one electrode is used to direct particles which have been independently charged by another source. In this embodiment, the electrode is used principally to control the deposition of the charged particles. Indeed, in one variation of this embodiment, the electrode is used to direct charged particles supplied by a conventional spray gun operating at a high particle mass flow rate. In other embodiments, the electrode may supplement an independent resin particle charger by charging only a portion of the particles.

The components, stations, and stages depicted in FIGS. 1–8 and described in connection therewith may be modified, substituted, interchanged, deleted, or combined as would occur to one skilled in the art without departing from the spirit of the present invention. For example, both systems 110 and 210 may include a heater similar to heater 30 of system 10 and a sprayer similar to sprayer 32. In another example, the embodiments of system 10 and 210 may be adapted to use an impregnation system similar to station 180 of system 110. In still another example, particle sources may be provided as a fluidized bed similar to that disclosed in U.S. Pat. No. 5,302,419 to Muzzy. These examples are not intended to be limiting, but rather are illustrative of a few alternative implementations of the present invention.

It is preferred that spreading of the tow fibers be selectively employed. Specifically, the fiber spreading technique used depends upon the type of fibers and associated packaging. Carbon fibers typically come in a single-ended package, without binding components to hold the fibers together. The individual fibers of the carbon tow are free to move relative to each other, aiding spreading.

In general, glass fibers are more difficult to spread than carbon fibers. Fiberglass is commonly packaged in two different forms, single-ended and multi-ended tows. The single-ended tow is a common form for E-glass which has one bundle of fibers bound together by a chemical binder. Single-ended glass fiber tows are preferably treated in the manner disclosed in FIGS. 1 and 2.

The multi-ended tow, a packaging form for S-glass as well as E-glass, combines several small single-ended tows into a larger tow. For example, a 12,000 strand S-glass tow might consist of 30 strands of 400 fibers each. For multi-ended tow fibers, the smaller tows comprising the entire strand are typically each coated with a binder. Spreading the smaller tows into individual fibers is generally undesirable so the heating stage to soften the binder is not ordinarily used. This modification reduces the chance of sizing damage that may cause a poor fiber-resin interface. It also may result in a less uniform distribution of resin among the fibers. As a result, some form of in-line rolling or pultrusion might be necessary for multi-ended glass fiber tows to achieve desired uniformity when used with a consolidation system.

The chambers and shrouds described herein are preferably made from a material suitable for exposure to the associated fibers, resins, and electric fields. In one embodiment, the chambers and shrouds are made from a durable, transparent material, such as a clear thermoplastic, to facilitate observation of the process taking place therein.

Polymer classes suitable for resin powders used with the present invention may be of the thermoplastic or thermoset variety. Examples of suitable polymer classes include, but are not limited to: the ABS group, acetals, acrylics, alkyd polyesters, allyls, aminos, epoxies, fluoroplastics, furnace, melamines, nylons, phenolics, phenylene oxides and ethers, polyamidemides, polybutylenes, polycarbonates, polyesters, poly (aryl ether ketone ketone) (PEKK), polyetheretherketones (PEEK), polyetherimides, polyethylenes, polyamides, polymethylpentenes, polyphenylene sulfides, polypropylenes, polystyrenes, polyurethanes, sulfones, ureas and vinyls.

All publications and patent applications cited in this specification are herein incorporated by reference as if each individual publication or patent application were specifically and individually indicated to be incorporated by reference.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method, comprising:

(a) moving a tow of long continuous fibers through a processing space;

(b) discharging a pressurized fluid stream entrained with a number of resin particles into the processing space through an orifice, the stream diverging from the orifice to distribute the particles in the processing space;

(c) electrostatically charging at least a portion of the particles received in the processing space from said discharging with a wire electrode positioned in the processing space;

(d) depositing the resin particles on the tow; and (e) fixing the resin particles to the tow after said depositing.

2. The method of claim 1, wherein the tow is exposed to an elongate segment of the wire electrode to generate an electric field therebetween, the electric field directing at least a portion of the particles during said depositing.

3. The method of claim 1, wherein the wire is roughened, has a length of at least 5 centimeters, and spans across a distance of at least 5 centimeters along the tow.

4. The method of claim 1, further comprising winding the tow about a mandrel to form a composite tube after said fixing.

5. The method of claim 1, further comprising cutting the tow into a number of segments after said fixing.

6. The method of claim 1, further comprising:

(f) spreading fibers of the tow;

(g) applying a conductive liquid to the tow to promote electrical conductivity; and wherein the resin particles are made from a thermoplastic resin compound and said fixing includes melting the particles deposited on the tow to form a molten resin matrix and compressing the tow and matrix between a pair of opposed non-rotating surfaces, at least one of said surfaces contacting the tow with an adjustable spring-bias.

7. The method of claim 1, wherein the resin particles are made of a compound selected from at least one of the ABS group, acetals, acrylics, alkyd polyesters, allyls, aminos, epoxies, fluoroplastics, melamines, nylons, phenolics, phenylene oxides and ethers, polyamides, polyamideimides, polybutylenes, polycarbonates, polyesters, poly (aryl ether ketone ketone) (PEKK), polyetheretherketones (PEEK), polyetherimides, polyethylenes, polymethylpentenes, polyphenylene sulfides, polypropylenes, polystyrenes, polyurethanes, sulfones, ureas or vinyls.

8. A method, comprising:

(a) moving a tow of long continuous fibers through a processing chamber;

(b) discharging a pressurized fluid stream entrained with a number of resin particles into the processing space through an orifice, the stream diverging from the orifice to distribute the particles in the processing chamber;

(c) generating an electric field between the tow and an electrode to direct at least a portion of the particles received into the chamber onto the tow, the electrode being separated a first distance from the tow and the orifice being positioned a second distance from the tow, the second distance being greater than the first distance; and (d) at least partially melting particles in contact with the tow.

9. The method of claim 8, further comprising shaping the electrode to control deposition of the particles on the tow.

10. The method of claim 8, wherein the electrode includes a plurality of wire segments oriented in a predetermined pattern to control deposition of the particles on the tow.

11. The method of claim 8, wherein the resin particles are made from a thermoplastic resin compound and further including consolidating the tow between two non-rotational surfaces to alter distribution of the matrix among the fibers, at least one of the surfaces contacting the tow under an adjustable spring bias.

12. The method of claim 8, wherein the tow travels along a first axis, the electrode includes a roughened wire with a length along a second axis, and the second axis crosses the first axis.

13. The method of claim 8, wherein the electrode includes a corona wire generally positioned between the orifice and the tow.

14. The method of claim 8, further comprising cutting the tow into a number of pieces after said fixing, the pieces being at least ⅛ of an inch in length.

15. The method of claim 8, further comprising:

(f) applying a conductive liquid to the tow to promote electrical conductivity; and (g) spreading the tow.

16. The method of claim 8, further comprising pressing the tow between two opposed surfaces, at least one of the surfaces being heated, and at least one of the surfaces applying pressure to the tow with an adjustable spring bias.

17. A method, comprising:

(a) moving a tow of long continuous fibers through a processing chamber;

(b) providing a number of charged resin particles in the chamber;

(c) disposing an elongate wire electrode in the chamber, one of the wire electrode and the tow being positioned above another of the wire electrode and tow, and the tow being exposed to a length of at least one centimeter of the wire electrode;

(d) generating an electric field between the electrode and the tow, the field emanating along the length of at least one centimeter of the wire electrode;

(e) depositing the resin particles charged on the tow; and (f) fixing the resin particles deposited to the tow after said depositing.

18. The method of claim 17, wherein the wire electrode is positioned over the tow.

19. The method of claim 18, wherein the wire electrode is roughened, has a length of at least ten centimeters, and spans across a width of the tow.

20. The method of claim 17, further comprising winding the tow about a mandrel and heating said tow to form a consolidated composite tube after said fixing.

21. The method of claim 17, wherein the resin particles are made from a thermoplastic resin compound and said fixing includes at least partially melting the resin particles.

22. The method of claim 17, wherein the wire electrode is curvilinear.

23. A method, comprising:

(a) electrostatically depositing a number of resin particles on a tow having a number of long continuous fibers;

(b) heating the tow to form a molten resin matrix from the particles;

(c) pulling the tow between a pair of surfaces, at least one of the surfaces engaging the tow under a spring bias to controllably compress the tow and matrix between the surfaces, the spring bias being adjustable; and (d) adjusting the spring bias to change pressure exerted on the tow by the pair of surfaces to improve impregnation of the tow with the molten resin matrix.

24. The method of claim 23, wherein the second surface is defined by a heated die and is stationary relative to the tow during said pulling.

25. The method of claim 23, wherein said pulling includes sliding the tow between the pair of surfaces, the surfaces being generally stationary relative to the tow during said pulling.

26. The method of claim 23, wherein one of the surfaces has a generally smooth arcuate shape and the spring bias is provided by a leaf spring.

27. The method of claim 23, wherein a first one of the surfaces is defined by a leaf spring and a second one of the of surfaces is defined by a heated die.

28. The method of claim 26, wherein said adjusting includes regulating pressure exerted on the tow by the first one of the surfaces with a pneumatic cylinder.

29. The method of claim 23, wherein said depositing includes:

moving a tow of long continuous fibers through a processing space;

discharging a pressurized fluid stream entrained with a number of resin particles into the processing space through an orifice, the stream diverging from the orifice to distribute the particles in the processing space; and electrostatically charging at least a portion of the particles received in the processing space from said discharging with a wire electrode positioned in the processing space.

30. A method, comprising:

(a) electrostatically depositing a number of resin particles on a tow having a number of long continuous fibers;

(b) heating the tow to form a molten resin matrix by melting the particles;

(c) pulling the tow through a first station along a travel axis, the first station having a first pair of opposing surfaces pressing the tow therebetween, at least one of the first pair of surfaces engaging the tow under a first spring bias; and (d) moving the tow through a second station positioned downstream of the first station along the travel axis, the second station having a second pair of opposing surfaces pressing the tow therebetween, at least one of the second pair of surfaces engaging the tow under a second spring bias.

31. The method of claim 30, wherein at least one of the first pair of surfaces is defined by a first heated die.

32. The method of claim 31, wherein at least one of the second pair of surfaces is defined by a second heated die.

33. The method of claim 31, wherein the first station exerts a first pressure on the tow and the second station exerts a second pressure on the tow, and the first and second pressures differ by a predetermined amount.

34. The method of claim 31, further comprising engaging the tow with a drive mechanism positioned along the travel axis between the first and second stations.

35. The method of claim 31, further comprising regulating pressure exerted on the tow by the first pair of surfaces with a controllable actuator operatively coupled to a processor.

36. The method of claim 31, wherein said depositing includes:

(d) moving a tow of long continuous fibers through a processing space;

(e) discharging a pressurized fluid stream entrained with a number of resin particles into the processing space through an orifice, the stream diverging from the orifice to distribute the particles in the processing space; and (f) electrostatically charging at least a portion of the particles received in the processing space from said discharging with a wire electrode positioned in the processing space.

37. An apparatus for manufacturing a composite by depositing a number of resin particles on a tow, the tow having a number of long continuous fibers, comprising:

a processing chamber;

a transport configured to move the tow through said processing chamber;

a particle source in fluid communication with said processing chamber, said particle source being configured to provide the resin particles in said processing chamber;

an elongate wire electrode coupled to said processing chamber, said wire electrode and the tow being configured with one over the other;

a voltage source configured to be electrically coupled to the tow and said electrode, said wire electrode being disposed relative to the tow to provide a generally cylindrically shaped charging region about said wire electrode to electrostatically charge the resin particles and generate an electric field between said electrode and the tow to direct deposition of the resin particles on the tow when said voltage source is coupled to the tow and said electrode; and a fixation unit configured to receive the tow from said processing chamber to fix the resin particles to the tow after deposition.

38. The apparatus of claim 37, wherein said electrode is further configured to generate said electric field to be generally symmetric about a longitudinal axis of said electrode.

39. The apparatus of claim 37, wherein said transport is configured to move the tow along an axis of travel and said electrode has a longitudinal axis generally parallel to said axis of travel.

40. The apparatus of claim 37, wherein said transport includes a spreader positioned upstream of said processing chamber to widen the tow by spreading the fibers generally along a plane, and said electrode has a longitudinal axis generally parallel to said plane.

41. The apparatus of claim 37, wherein said transport includes:

a first spool configured to supply the tow for processing;

a spreader to spread the fibers of the tow before the tow enters said processing chamber; and a second spool configured to collect the tow from said fixation unit.

42. The apparatus of claim 37, further comprising a processing station with a pair of surfaces configured to receive the tow and controllably press the tow therebetween in accordance with an adjustable spring bias.

43. The apparatus of claim 37, further comprising a chopper unit configured to receive the tow from said fixation unit to cut the tow into a number of pieces.

44. An apparatus for manufacturing a composite by depositing a number of resin particles on a tow, the tow having a number of long continuous fibers, comprising:

a tow-conveying device configured to move the tow through a particle deposition chamber;

a particle source in fluid communication with said chamber, said particle source being configured to discharge the resin particles into said chamber;

an electrode positioned within said chamber, said electrode being configured to electrostatically charge the particles received within said chamber for deposition on the tow;

a first processing stage configured to receive the tow from said chamber, said first stage including a first surface opposing a second surface, said device being configured to pull the tow between said first and second surfaces, said first surface being engaged by a controllable actuator to exert a first controlled pressure on the tow when positioned between said first and second surfaces, at least one of said first and second surfaces being heated to form a molten resin matrix from the particles deposited on the tow; and a controller operatively coupled to the first stage, the controller being configured to generate a first control signal to regulate the first pressure exerted by the first surface.

45. The apparatus of claim 44, further comprising a second processing stage including a pair of surfaces configured to receive the tow therebetween, at least one of said pair of surfaces being heated, said pair of surfaces being further configured to press against the tow on opposite sides.

46. The apparatus of claim 45, wherein said device includes a source spool and a drive mechanism configured to contact the tow between the first and second stages.

47. The apparatus of claim 45, wherein said second stage is configured to exert a second pressure on the tow, and said first and second pressures differ by a predetermined amount.

48. The apparatus of claim 44, wherein said electrode provides a means for generating an electric field with a selected geometry, the geometry being selected to control particle deposition in a predetermined manner.

49. The apparatus of claim 44, wherein said controller includes a second control signal, said device being responsive to said second control signal to regulate speed of the tow.

50. The apparatus of claim 44, wherein said first surface is configured to engage the tow with a spring bias.

51. The method of claim 23, wherein the tow is not confined to a fixed cross sectional area when being compressed between the pair of surfaces.

52. The method of claim 29, wherein said depositing further includes:

applying a conductive liquid to the tow to promote electrical conductivity;

spreading fibers of the tow; and at least partially melting the particles after said depositing in an oven.

53. The method of claim 30, wherein the tow is not confined to a fixed cross sectional area when being pressed between the first pair of surfaces or the second pair of surfaces.

54. The method of claim 35, further comprising adjusting pressure exerted on the tow by the second pair of surfaces with another controllable actuator operatively coupled to the processor.

55. The apparatus of claim 37, wherein said wire electrode is configured to be positioned above the tow to correspondingly locate said generally cylindrically shaped charging region above the tow.

56. The apparatus of claim 37, wherein said wire electrode spans across a width of the tow.

57. The apparatus of claim 44, wherein said electrode includes a wire arranged to span across at least a portion of the tow.

58. The apparatus of claim 57, wherein said wire is configured to be located over the tow to generate a generally cylindrically shaped charging field above the tow and provide an electric field between said wire and the tow that emanates along an elongate portion of said wire to direct deposition of the particles.

* * * * *